Patented Nov. 11, 1924.

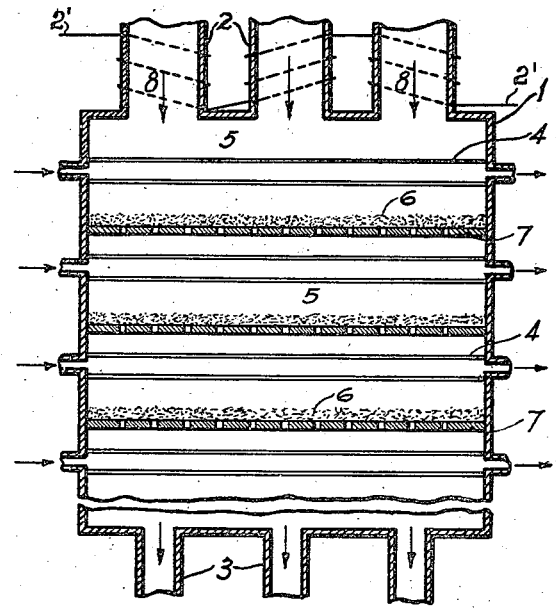
Fig. I.
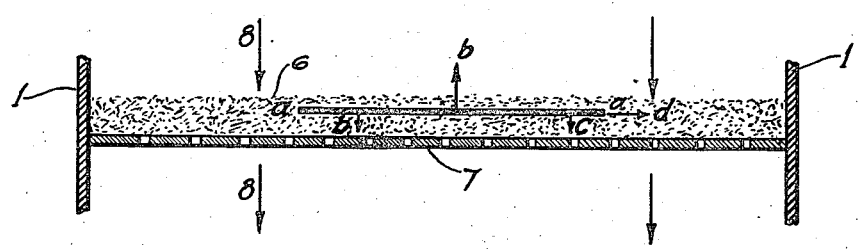
Fig. II.

1,515,299

UNITED STATES PATENT OFFICE.

CHARLES R. DOWNS AND CHARLES G. STUPP, OF CLIFFSIDE, NEW JERSEY, ASSIGNORS TO THE BARRETT COMPANY, A CORPORATION OF NEW JERSEY.

PROCESS AND APPARATUS FOR CATALYTIC OXIDATION.

Application filed December 7, 1918. Serial No. 265,777.

*To all whom it may concern:*

Be it known that we, (1) CHARLES R. DOWNS and (2) CHARLES G. STUPP, citizens of the United States, residing at (1) Cliffside and (2) Cliffside, in the counties of (1) Bergen and (2) Bergen and States of (1) New Jersey and (2) New Jersey, have invented certain new and useful Improvements in Processes and Apparatus for Catalytic Oxidation, of which the following is a specification.

This invention relates to a process of and an apparatus for removing the exothermic heat generated by chemical reactions of compounds in the vapor phase. The invention is especially adapted to the removal of heat from the oxidation of organic compounds wherein the reaction is carried out in the vapor phase in the presence of a catalyzer.

It is well known that many chemical reactions develop heat so that the temperature may sometimes rise so high as to be objectionable and even injure the substances which it is desired to produce. This is especially true of the oxidation of organic compounds in the vapor phase by gaseous oxygen in the presence of a catalyzer when it is desired to produce partially oxidized products as distinct from products of complete combustion. In all such oxidations it appears that there is a specific temperature at which partial oxidation is initiated, for each compound in question, that there is a definite temperature range above this primary temperature wherein the products of partial oxidation are substantially stable in the presence of the vapor of the unreacted organic substance, excess oxygen and catalyst and that above this temperature there is a point at which products of complete combustion are formed in undesirable amounts. When such oxidations take place a large proportion of the heat developed is transferred to the catalyst and unless removed the temperature of the same rises beyond the primary temperature and succeeding temperature range noted above, to a temperature whereat only complete combustion results. Of course there is a certain proportion of the heat of reaction which is carried away by the effluent gases but this is dependent upon the heat carrying capacity of the same. Whenever the heat carrying capacity of the effluent gases is less in amount than the heat production of the reaction, this heat is stored up in the catalyst and must be removed by some other means. This is often taken care of by allowing said heat to be conducted by the catalytic mass to the walls of the reaction chamber and from thence radiating it to the atmosphere or to other cool gases. Apparatus of such design is applicable only to those reactions wherein the heat evolution is relatively small or else the linear heat travel by conduction must be greatly reduced. If this were the only method available, reactions of highly exothermic character would have to be operated in tubes of very restricted diameter. From a standpoint of commercial production of many such products this would not be practicable and the purpose of the invention described in this application is to depict an apparatus whereby this difficulty is solved in that chambers of any cross section may be used.

Other forms of apparatus which have been used or suggested for controlling the heat of exothermic reactions of gaseous compounds employ the addition of live steam or cool reaction mixture injected into or near the reaction zone thereby removing the excess heat. When such means are used either an undesirable dilution of the reaction mixture takes place or there is a possibility of cooling the reacting gases below a temperature which is desirable for a proper reaction.

Still other forms of apparatus make use of the alternate reaction and cooling zone system wherein the gases are allowed to alternately heat up and cool down. They, however, do not embody sufficient control of the catalyst temperature except at the entering surface of the same. Such apparatuses depend only upon the heat carrying capacity of the effluent gases and as noted above this is often insufficient.

It has been the object of the present applicants to devise a form of apparatus in which the disposition of the reaction zones and heat controlling means are such that heat removal takes place not only by convection but more particularly by radiation.

In practicing this invention the reaction mixture at the proper temperature may be passed into a restricted space containing a catalyst whereupon the reaction begins and the temperature rises. Before the reaction progresses too far and the temperature rises too high the mixture, in which the reaction has been only partially completed, is passed into a cooling space where its temperature is lowered and it is then passed into another similar space containing a catalyst where the reaction is continued with a consequent rise in temperature again. The mixture is again passed into a cooling space and so on until the reaction has developed as far as desirable or feasible. It has been found, however, that the percentage of the total reaction which it is possible to obtain in each catalyst chamber can be greatly increased by removing heat from the catalytic mass by radiation in addition to that by convection. In this way the process is performed without seriously injuring the materials being treated or the products of the reaction and without materially slowing up the process.

The invention will be readily understood from the accompanying drawings, and description in connection therewith, which illustrates a particular embodiment of the invention which has been found to work well in practice.

Figure I is a side view of the apparatus shown partly in section.

Figure II is an enlarged view of one of the compartments shown in Figure I.

In Figure I reference character 1 represents a chamber in which the reaction takes place. Leading into this chamber are the inlet members 2 and leading from it are the outlets 3. The reaction mixture entering the apparatus is heated in the members 2 to a temperature which is suitable for the inception of the reaction. This may be accomplished by heating the members 2 externally by any means or by heating them internally by a coil or otherwise. An external heating coil is shown at 2'. The method of preheating the reaction mixture is unimportant provided it arrives in chamber 1 at substantially the lowest temperature at which it is proper to start the reaction. The reaction chamber 1 is divided into a number of compartments 5. The compartments 5 contain a porous catalyst or a suitable porous vehicle such as ground or crushed pumice, asbestos, etc., carrying a catalyst 6 which is supported by the perforated shelves 7 or other suitable means through which the reaction gases may freely pass. It is obvious that if the catalyst is by nature metallic and capable of being woven into cloth or gauze, the shelves 7 are unnecessary as the catalyst may be supported from the walls of the reaction chamber. Above the catalyst layer the compartments 5 contain pipe coils, grids, radiators, or other suitable cooling means 4 through which independently regulated liquid or gaseous cooling fluids, other than those constituting the reaction mixture, may be internally circulated. Beyond the last compartment 5 is a final cooling grid 4. The outlets 3 lead to a condensing system of any suitable type not shown or to other suitable receptacles.

For purposes of more clearly describing the advantages of this apparatus Fig. II is given in diagrammatic form in which is illustrated the catalytic mass. The line $a$—$a$ represents a hypothetical portion or plane in the body of the catalyst 6 in compartment 5 where heat is developed. Arrows $b$ designate directions perpendicular to the plane $a$—$a$ in which heat flows from the plane by radiation. Arrow $c$ pointing in the direction of vapor flow, designates the direction of heat flow by convection. It is evident that the proportion of heat flow by radiation in the direction of the arrows $d$, parallel to the plane $a$—$a$, becomes very small with a catalytic layer of any considerable dimensions transverse to the vapor flow. All removal of heat in the directions of the arrows $d$ is, therefore, disregarded in this application as being entirely insufficient, in a chamber of ordinary size to control the reaction. Catalytic layers having lengths and breadths each more than fifty times their depths have been found to operate satisfactorily and to be easily controlled when maleic acid is being produced from benzene. It has been found that this flow of heat from the catalytic mass both by convection and radiation in the manner described above is decidedly beneficial and that thereby regulation of the temperature of the catalyst may be very closely controlled. It is also apparent that to obtain the greatest efficiency of catalyst temperature control the grids both below and above the catalyst layer must be very close to the same.

It is also to be noted that there is no direct contact between the catalyst and the cooling grids or heat extracting means 4, such contact would be detrimental where it is necessary to use a cooling fluid whose temperature must be below the proper reaction temperature in the catalytic zone. Physical contact under such conditions would result in uneven cooling of the catalyst by conduction, with certain particles of it so chilled, as to interfere with their function or lessen their efficiency in the process.

The operation will be described specifically in connection with the treatment of benzene to form maleic acid by oxidation in the presence of a catalyst such as vanadium oxide, though it is to be understood that the invention is not to be restricted to these particular materials as the process can be practiced with many other materials without departing from the spirit and scope of the invention as set forth in the claims.

Benzene in the form of vapor, mixed with the proper amount of oxygen or air and other diluents when desirable, is introduced into the members 2 where it is heated to the proper temperature, say around 400° C., by any convenient means and from thence it enters the reaction chamber 1. The hot mixture of benzene and oxygen or benzene, oxygen and diluent gases passes through the first cooling means 4 in the upper part of compartment 5 and then comes into contact with the catalyst 6, such as vanadium oxide, and the reaction by which maleic acid is formed, begins. The temperature rises rapidly because of the exothermic action and if it were not properly and carefully controlled it would rise so high that the products would be those of complete combustion. Therefore, before it has risen to a temperature where there is danger of complete combustion the mixture passes on and is cooled by the second cooling means 4. In passing through this cooling means 4 the temperature of the gaseous mixture is lowered to approximately the temperature mentioned above, say around 400° C., when it passes into the next catalytic mass 6 where the temperature again rises. It is understood that the simple cooling of the gases as they emerge from the catalyst zones is insufficient and that a large proportion of the heat developed in these zones is radiated to the cooling means 4 above and below the same and that this property is a vital advantage of our apparatus. The direction of reaction mixture flow throughout the whole system is indicated by the arrows 8. The number and depth of the reaction, and cooling zones will be selected to suit the materials being treated. With benzene to form maleic acid as above outlined, the depth and the concentration of the catalyzer, the velocity of the reaction mixture, the relation of oxygen to benzene and the presence or absence of diluent gases all share in determining the low and high temperatures allowable in the catalytic mass. There is, however, a certain range of temperature between that at which maleic acid is formed and that at which it is further oxidized largely to $CO_2$ and $H_2O$. Certain combinations of the above variables allow this temperature range to be 50° C., that is, the reaction mixture must enter the catalytic mass not below 400° C., and leave not above 450° C. Other combinations may prescribe considerably different temperature conditions.

Fixed temperature limits for proper operation are also needed for practically all partial oxidations of organic substances in the vapor phase with which the applicants are familiar. This is also true of many inorganic oxidations in the vapor phase except that in these cases an undesirable rise in temperature results in the dissociation of the desired products rather than in the formation of higher oxidation products. The apparatus as described in this application has been designed to properly control the catalyst temperature for such reactions so that the accelerating effect of exothermic heat formation may be retarded, to prevent the complete oxidation of organic compounds on the one hand or to prevent the undesirable dissociation of inorganic oxidation products on the other.

In addition to the partial oxidation of benzene, as above described this apparatus may be used to provide the proper reaction temperature for the partial oxidation of many other compounds such as naphthalene, toluene, anthracene, phenanthrene, aniline, ortho cresol, phenol, xylene, cresol, methyl alcohol and ethyl alcohol, both of which are alifatic alcohols, alifatic alcohols, ethylene, acetylene, ammonia, $SO_2$, etc., when these are in the vapor phase and mixed with oxygen containing gases as oxidizing agents.

It is obvious that in all cases the particular temperature limits between which the catalytic zone is maintained will be dependent upon the particular mixture which is being treated. The desideratum to be attained is that the temperature should not be so low that the reaction will not be produced nor so high that the products will be decomposed to any very great extent. The temperature in the successive reaction chambers may be made to increase or decrease progressively, if desired, by extracting less or more heat by the cooling means than is evolved in the reaction zones. That is to say, as diluent gases, for example $CO_2$ or other by-products increase in amount with each reaction zone it may be advisable to allow the temperature of the successive catalytic zones to increase progressively.

It is not our intention that this apparatus be restricted to the use of vanadium oxide, as a catalyst, but any catalyst that will accomplish the desired result may be employed.

Claims:

1. The process of producing maleic acid which comprises raising the vapor of benzene mixed with an oxygen containing gas to a temperature of approximately 400° C., passing the mixture into contact with vanadium oxide as a catalyst, permitting the temperature to rise about 50° C. and then passing said mixture into contact with a cooling surface.

2. The process of producing maleic acid which comprises raising the vapor of benzene mixed with an oxygen containing gas to a temperature of about 400° C. at which the benzene ring will be split and maleic acid will be formed in the presence of vanadium oxide as a catalyst, passing said heated mixture into contact with the catalyst and permitting the temperature to rise, and removing said mixture from contact with said catalyst before a temperature is reached at which excessive combustion would take place.

3. The process of producing maleic acid which comprises passing a mixture of benzene vapor and an oxygen containing gas into contact with vanadium oxide as a catalyst a plurality of times in succession at a temperature of about 400° C. to promote reaction and cooling said mixture while in transit between successive contacts with the catalyst.

4. The process of producing maleic acid which comprises passing benzene vapor and an oxygen containing gas through a plurality of thin layers of vanadium oxide heated to a temperature of approximately 400° C., and maintaining the temperature within an approximate range of 50° C. by removing heat from between said layers of catalyst.

In testimony whereof we affix our signatures.

CHARLES R. DOWNS.
CHARLES G. STUPP.